(12) United States Patent
Almkvist

(10) Patent No.: US 6,640,785 B2
(45) Date of Patent: Nov. 4, 2003

(54) METHOD AND DEVICE FOR AN INTERNAL COMBUSTION ENGINE

(75) Inventor: Göran Almkvist, Lerum (SE)

(73) Assignee: SEM AB, Amal (SE)

(*) Notice: Subject to any disclaimer, the term of this patent is extended or adjusted under 35 U.S.C. 154(b) by 0 days.

(21) Appl. No.: 10/258,078

(22) PCT Filed: Apr. 17, 2001

(86) PCT No.: PCT/SE01/00836

§ 371 (c)(1),
(2), (4) Date: Oct. 17, 2002

(87) PCT Pub. No.: WO01/79690

PCT Pub. Date: Oct. 25, 2001

(65) Prior Publication Data

US 2003/0047170 A1 Mar. 13, 2003

(30) Foreign Application Priority Data

Apr. 19, 2000 (SE) .............................................. 0001451

(51) Int. Cl.⁷ .............................................. F02M 51/00
(52) U.S. Cl. ...................................... 123/492; 123/480
(58) Field of Search ................................ 123/492, 480, 123/295, 298, 299, 300, 305

(56) References Cited

U.S. PATENT DOCUMENTS

| 4,096,839 A | 6/1978 | Niertit |
| 4,388,906 A | 6/1983 | Sugiyama et al. |
| 4,671,234 A | 6/1987 | Tegtmeier |
| 4,939,658 A | 7/1990 | Sekozawa et al. |
| 5,174,260 A | * 12/1992 | Nonogawa et al. ......... 123/432 |
| 5,209,205 A | 5/1993 | Auracher et al. |
| 5,297,531 A | 3/1994 | Akase |
| 5,762,054 A | 6/1998 | Schumacher et al. |
| 6,122,589 A | * 9/2000 | Yamaguchi et al. ........ 701/106 |

* cited by examiner

*Primary Examiner*—John Kwon
(74) *Attorney, Agent, or Firm*—Ware, Fressola, Van der Sluys & Adolphson LLP

(57) ABSTRACT

In a method and device for fuel injection intended for an internal combustion engine with a wide range of speeds of revolution and with high requirements for rapid response such as, for example, the engine in a motor cycle, the fuel injection to the internal combustion engine comprising an intake pipe (1) with at least one intake valve (2) and one or more injectors is controlled in such a manner that a first fuel injection in order to obtain a well prepared air/fuel mixture occurs early in the working cycle of the engine following the closure of the intake valve and a second fuel injection in order to obtain an optimal amount of fuel for the cycle, a process known as "transient compensation", occurs late in the working cycle before closure of the intake valve.

13 Claims, 2 Drawing Sheets

METHOD AND DEVICE FOR AN INTERNAL COMBUSTION ENGINE

BACKGROUND OF THE INVENTION

1. Technical Area

The present invention concerns a device for fuel injection intended for an internal combustion engine with a wide range of speeds of revolution and with high requirements for rapid response such as, for example, the engine in a motorcycle, and a method of controlling fuel injection to such an engine.

2. Description of the Background Art

It is of the highest importance in internal combustion engines that the correct mixture of air and fuel is obtained at the correct instant in order to obtain maximal power and to achieve minimum emissions. Better control of the air/fuel mixture is obtained with the aid of fuel injection than is obtained in an engine with a carburettor. It is most common that injection occurs in the intake pipe prior to the combustion chamber. Two injectors are normally required in engines with a wide range of speeds of revolution in order to cope with the dynamic properties of the engine. The engines of motorcycles are examples of engines with advanced dynamic properties and high requirements for rapid response. The injectors have previously most often been applied in parallel and in this way received similar properties for the preparation of air/fuel. In cases where high requirements for rapid response are present, one disadvantage with existing solutions comprising double injectors working in parallel at a considerable distance from the combustion chamber is the surface film that forms when the fuel mixture is spread in the intake pipe, and the long transport time between the injection valve and the intake valve that the fuel mixture must travel. Existing solutions comprising double injectors working in parallel with a short distance to the combustion chamber have problems with poor fuel/air preparation due to the time and transport path being too short, and there are problems with the construction of these solutions.

The present invention concerns the provision of a solution that satisfies the high requirements for rapid and exact fuel supply that is required in motors with advanced dynamic properties.

SUMMARY OF THE INVENTION

The present invention concerns a method for controlling fuel injection into an internal combustion engine with advanced dynamic properties and a device for fuel injection into an internal combustion engine.

In the invention according to the present application the fuel injection to an internal combustion engine comprising an intake pipe with at least one intake valve and one or more injectors is controlled in such a manner that a first fuel injection to obtain a well prepared air/fuel mixture occurs early in the working cycle of the engine following the closure of the intake valve and a second fuel injection to obtain an optimal amount of fuel for the cycle, a process known as "transient compensation", occurs late in the working cycle before closure of the intake valve.

In order to know exactly the instant at which transient compensation is to take place, a function of the speed of revolution is used whereby the timing can be estimated and transient compensation can occur as late as possible before closure of the intake valve for the most rapid response possible. Calculations of the required amount of fuel for both stationary conditions and for transient compensation are based on the dynamic properties of the surface film. The position of the throttle is also detected for the correct calculation of the amount of fuel for transient compensation. In this way, the possibility of being able to provide compensation with the correct amount of fuel at the correct instant immediately before the valve closes is obtained. In this way, control of the amount of fuel injected is achieved, and the fuel is provided exactly when it is needed. It is difficult using traditional technology to estimate the amount of fuel that actually entered the cylinder before the valve closed and how much remained for the next cycle.

BRIEF DESCRIPTION OF THE DRAWINGS

In the following text, reference will be made to the accompanying drawings for a better understanding of the described embodiments and examples of the present invention, in which.

DETAILED DESCRIPTION OF PREFERRED EMBODIMENTS

Figure 1:
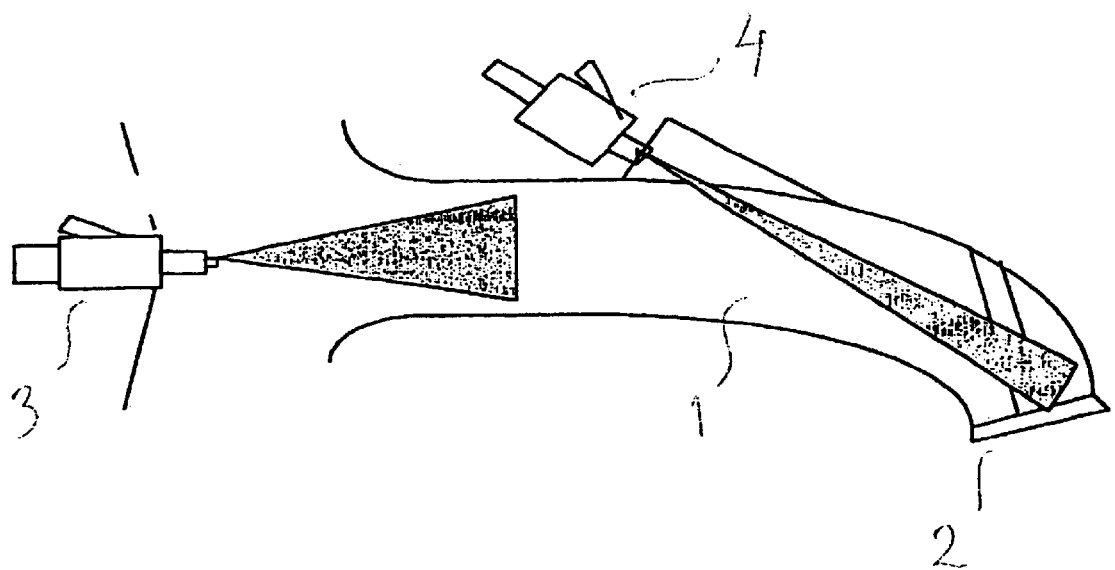
FIG. 1 shows a sketch of a device according to the present invention.

FIG. 1 shows an intake pipe 1 with an intake valve 2, a first injector 3 and a second injector 4. In one preferred embodiment, the first injection occurs from a first injector 3 and the second injection occurs from a second injector 4. The said injectors are arranged in the intake pipe 1 such that the first and the second injectors are displaced relative to each other in the direction of flow of the air flow, whereby the second injector is arranged close to the intake valve while the first injector is arranged considerably earlier in the direction of flow of the air. In this way, a difference concerning the transport time for the fuel mixture from each injector to the intake valve is achieved. In this embodiment, the first injector 3 is principally used for the injection of an amount of fuel corresponding to stationary conditions, while the second injector 4 is principally used for compensation of fuel supply under transient conditions. The jet of fuel mixture from the second injector 4 in one preferred embodiment is aimed directly at the intake valve 2.

Figure 2:
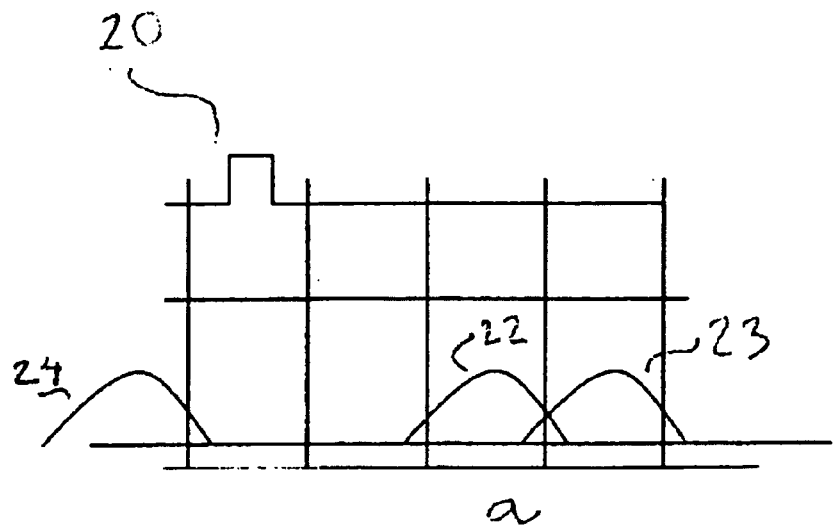
FIGS. 2a and 2b show the fuel injection pulses as a function of time.
Figure 2:
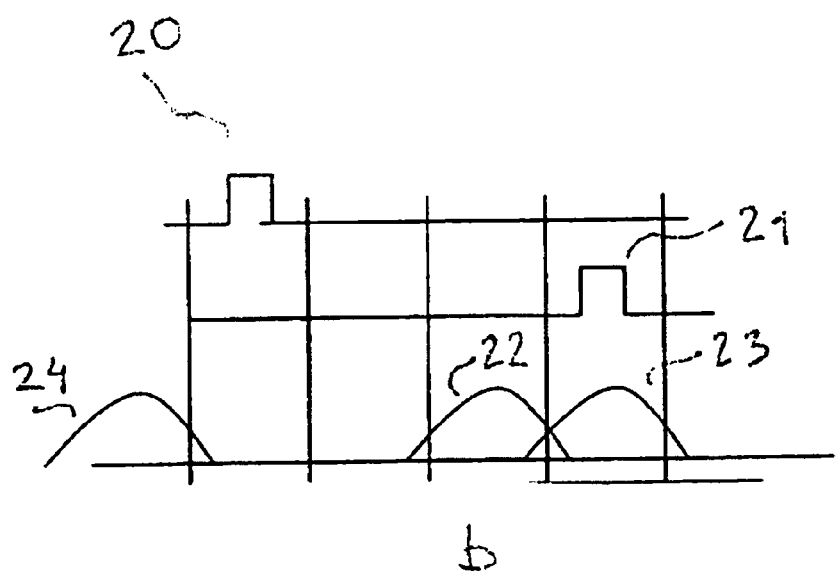

FIGS. 2a and 2b show the fuel injection pulses from the first injector 3 and from the second injector 4 as functions of time. Stationary injection is shown in FIG. 2a. A pulse 20 is a fuel injection from the first injector 3. The curve 24 shows how the intake valve 2 opens and closes during the previous cycle. The pulse 20 lies immediately after the intake valve 2 has closed during the previous cycle. FIG. 2b shows transient injection. A pulse 21 is an injection of fuel from the second injector 4. The curve 23 shows how the intake valve 2 opens and closes during the current working cycle while the curve 22 shows how the exhaust valve opens and closes. The pulse 21 lies late in the working cycle, immediately before the intake valve 2 closes.

Compensation of the fuel supply during transient conditions is carried out simultaneously with rotation of the crank angle of the engine. In order to optimize the amount of fuel for the current cycle, compensation occurs at that crank angle that is the latest crank angle possible in order for the injected fuel amount to have sufficient time to enter the cylinder before the intake valve 2 closes. This latest recent crank angle varies with the speed of revolution of the engine.

The device according to the present application comprises an intake pipe 1 with at least one intake valve 2 with a valve head and at least one injector. In one preferred embodiment a first injector 3 and a second injector 4 are arranged in the said intake pipe 1. The said first and second injectors are arranged displaced relative to each other with respect to the direction of flow of the air. The rapid dynamic properties of the motor are handled by combining these two injectors.

The second injector 4 is arranged close to the intake valve, while the first injector 3 is arranged considerably earlier in the direction of flow of the air. In this way, a difference in the transport time from the injection valve to the intake valve is achieved, and a difference in the target image for the fuel mixture from the different injectors. The second injector 4 is primarily designed for high loads and transient compensation. The location of the second injector and the simultaneous compensation of transients provide the possibility for a rapid and exact injection directly towards an open valve at high loads, which cools the mixture more and in this way gives a higher torque through a higher degree of filling of the combustion chamber. These two factors also give a lower sensitivity to knocking. A short transport time for the fuel mixture between the injection valve and the intake valve is achieved by placing the second injector 4 as close as possible to the intake valve 2, which gives a rapid response when the load is increased. In one preferred embodiment, the first injector 3 can be of the type known as "single jet type" with a broad cone, while the second injector 4 can be of the type known as "multi-jet type" depending on the number of intake valves.

In one preferred embodiment, the second injector 4 is angled relative to the first, or the injectors can be arranged such that the jets of fuel are arranged at an angle, in such a manner that the jet of fuel mixture can be directly aimed at the valve head, giving a more rapid response for the engine.

The function and construction of the present invention is assumed to be made clear by the description given. Even if the embodiments that have been shown or described have been preferred, it is evident that modifications of these can be made within the framework of the scope that is defined in the accompanying claims.

What is claimed is:

1. A method to control fuel injection in an internal combustion engine comprising the steps of:
   (a) providing at least one intake pipe with at least one intake valve, a first injection and a second injector, the first injector in the intake pipe arranged significantly upstream of the second injector in a direction flow of air in the at least one intake pipe, the second injector is arranged close to the intake valve in the intake pipe;
   (b) providing a first injection of fuel from the first injector in order to obtain a well prepared fuel/air mixture early in a working cycle of the engine following closure of the at least one intake valve, the first injection of fuel is principally used for injection along the direction of flow of the air towards the at least one intake valve of an amount of fuel that corresponds to stationary conditions; and
   (c) providing a second injection of fuel from the second injector in order to obtain an optimal amount of fuel late in the working cycle before closure of the at least one intake valve, the second injection of fuel is injected directly towards the at least one intake valve when open, whereby the second injection of fuel is principally used for supply of fuel during transient conditions and a difference in transport time for fuel from the first and second injectors to the at least one intake valve is achieved.

2. The method according to claim 1, wherein compensation of fuel supply during transient conditions is carried out simultaneously with rotation of a crank angle of the engine, in such a manner that injection occurs at the crank angle depending on speed of revolution of the engine, so that the second injection of fuel enters a cylinder of the engine before the at least one intake valve closes.

3. The method according to claim 2, wherein calculation of the compensation of fuel supply during transient conditions is based on detection of a position of the throttle.

4. The method according to claim 1, wherein calculation of compensation of fuel supply during transient conditions and stationary conditions is based on dynamic properties of surface film.

5. The method according to claim 1, wherein calculation of compensation of fuel supply during transient conditions is based on dynamic properties of surface film.

6. The method according to claim 1, wherein calculation of compensation of fuel supply during stationary conditions is based on dynamic properties of surface film.

7. A device to control fuel injection in an internal combustion engine, comprising:
   (a) at least one intake pipe with at least one intake valve having a valve head;
   (b) a first injector arranged to obtain a well prepared fuel/air mixture early in a working cycle of the engine following closure of the at least one intake valve by means of a first injection of fuel into the at least one intake pipe, the first fuel injection is arranged to occur along a direction of flow of air towards the at least one intake valve from the first injector in the at least one intake pipe, the first injection of fuel is intended to correspond to stationary conditions; and
   (c) a second injector arranged to obtain an amount of fuel for the working cycle late in the working cycle before closure of the at least one intake valve by means of a second injection of fuel, the second injection of fuel is arranged to occur from the second injector, which is arranged close to the intake valve in the intake pipe and significantly downstream from the first injector in the direction of flow of air and the second injection of fuel is aimed directly towards the at least one intake valve when open, whereby the second injection of fuel is principally intended for supply of fuel during transient conditions and a difference in transport time for fuel from the first and second injectors to the at least one intake valve is achieved.

8. The device according to claim 7, wherein the first and second injectors are arranged such that the first and second injections of fuel are at an angle relative to each other.

9. The device according to claim 8, wherein the second injector is a multi-jet type injector.

10. The device according to claim 9, wherein the first injector is a single jet type injector with a broad cone.

11. The device according to claim 8, wherein the first injector is a single jet type injector with a broad cone.

12. The device according to claim 7, wherein the first injector is a single jet type injector with a broad cone.

13. The device according to claim 7, wherein the second injector is a multi-jet type injector.

* * * * *